(12) United States Patent
Abe et al.

(10) Patent No.: US 9,851,754 B2
(45) Date of Patent: Dec. 26, 2017

(54) INFORMATION PROCESSING DEVICE

(71) Applicant: FUJITSU LIMITED, Kawasaki-shi, Kanagawa (JP)

(72) Inventors: Takashi Abe, Kawasaki (JP); Takashi Iijima, Kawasaki (JP); Shinya Matsushita, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/224,010

(22) Filed: Jul. 29, 2016

(65) Prior Publication Data
US 2017/0053755 A1 Feb. 23, 2017

(30) Foreign Application Priority Data
Aug. 19, 2015 (JP) .................................. 2015-162182

(51) Int. Cl.
  *G06F 1/16* (2006.01)
  *G06F 3/0354* (2013.01)
  *H01H 13/705* (2006.01)
  *G06F 3/033* (2013.01)

(52) U.S. Cl.
  CPC ............ *G06F 1/1633* (2013.01); *G06F 1/169* (2013.01); *G06F 1/1684* (2013.01); *G06F 3/03547* (2013.01); *H01H 13/705* (2013.01); *G06F 1/1624* (2013.01); *G06F 1/1662* (2013.01); *G06F 1/1669* (2013.01); *G06F 3/033* (2013.01)

(58) Field of Classification Search
  CPC .... G06F 1/169; G06F 1/1684; G06F 3/03547; G06F 1/1633; G06F 3/033; G06F 1/1613; G06F 1/1624; G06F 1/1662; G06F 1/1669; G06F 1/1671; H01H 13/705
  See application file for complete search history.

(56) References Cited

U.S. PATENT DOCUMENTS

| | | | |
|---|---|---|---|
| 6,219,038 B1* | 4/2001 | Cho ...................... | G06F 1/1616 200/305 |
| 9,329,707 B2* | 5/2016 | Su ....................... | G06F 3/03547 |
| 2004/0200701 A1* | 10/2004 | Nakatani ............... | G06F 1/1616 200/181 |
| 2006/0022957 A1* | 2/2006 | Lee ..................... | G06F 3/03547 345/173 |

(Continued)

FOREIGN PATENT DOCUMENTS

JP 11-53972 A 2/1999

*Primary Examiner* — Zachary M Pape
*Assistant Examiner* — Douglas Burtner
(74) *Attorney, Agent, or Firm* — Westerman, Hattori, Daniels & Adrian, LLP

(57) ABSTRACT

An information processing device includes: a case; a base member that includes an attachment hole and a positioning hole, and that is provided inside the case; a switch that is fixed to the base member; a button member that includes an operation button that moves toward and away from the switch; an anchor member that is provided at the button member, and that includes an insertion tab that is inserted into the attachment hole and a claw that projects out from a leading end side of the insertion tab and that is hooked onto an edge portion of the attachment hole; and a positioning protrusion that is provided at the button member, and that is inserted into the positioning hole, the positioning hole being formed in an elongated hole shape extending along a projection direction of the claw.

19 Claims, 12 Drawing Sheets

(56) References Cited

U.S. PATENT DOCUMENTS

| | | | |
|---|---|---|---|
| 2006/0060462 A1* | 3/2006 | Toyoda | H01H 3/122 200/329 |
| 2007/0023270 A1* | 2/2007 | Watanabe | H01H 13/705 200/341 |
| 2007/0139389 A1* | 6/2007 | Lin | G06F 1/1616 345/173 |
| 2007/0144885 A1* | 6/2007 | Nakatani | G06F 1/1616 200/520 |
| 2007/0236473 A1* | 10/2007 | Hong | G06F 1/1616 345/173 |
| 2010/0103611 A1* | 4/2010 | Yang | G06F 1/1616 361/679.55 |
| 2011/0075336 A1* | 3/2011 | Chiang | G06F 1/169 361/679.02 |
| 2011/0079498 A1* | 4/2011 | Lin | G06F 3/03547 200/341 |
| 2011/0249383 A1* | 10/2011 | Horii | G06F 1/169 361/679.01 |
| 2011/0254786 A1* | 10/2011 | Wen | G06F 1/1616 345/173 |
| 2011/0254787 A1* | 10/2011 | Cheng | G06F 3/03543 345/173 |
| 2011/0304961 A1* | 12/2011 | Lin | G06F 1/169 361/679.01 |
| 2012/0162867 A1* | 6/2012 | Fujimura | G06F 1/1656 361/679.01 |
| 2012/0229396 A1* | 9/2012 | Tsai | G06F 3/03547 345/173 |
| 2012/0314347 A1* | 12/2012 | Zhang | G06F 1/169 361/679.1 |
| 2013/0154953 A1* | 6/2013 | Lai | G06F 3/03547 345/173 |
| 2013/0207928 A1* | 8/2013 | Takata | G06F 3/0414 345/174 |
| 2014/0104768 A1* | 4/2014 | Yang | G06F 1/169 361/679.02 |
| 2014/0211396 A1* | 7/2014 | Shiroishi | G06F 1/1671 361/679.18 |
| 2014/0313648 A1* | 10/2014 | Yang | G06F 1/169 361/679.01 |
| 2014/0339062 A1* | 11/2014 | Glad | G06F 3/03547 200/343 |
| 2015/0009156 A1* | 1/2015 | Hsueh | G06F 3/0202 345/173 |
| 2015/0160750 A1* | 6/2015 | Wu | G06F 3/016 345/173 |
| 2015/0169117 A1* | 6/2015 | Ho | G06F 3/03547 345/173 |
| 2015/0185769 A1* | 7/2015 | Takata | G06F 3/0338 345/173 |
| 2016/0139637 A1* | 5/2016 | Doi | G06F 1/1679 361/679.4 |

* cited by examiner

INFORMATION PROCESSING DEVICE

CROSS-REFERENCE TO RELATED APPLICATION

This application is based upon and claims the benefit of priority of the prior Japanese Patent Application No. 2015-162182, filed on Aug. 19, 2015, the entire contents of which are incorporated herein by reference.

FIELD

The embodiments discussed herein are related to an information processing device.

BACKGROUND

Information processing devices exist that include a switch provided inside a case and an operation button that presses down the switch (see, for example, Japanese Laid-open Patent Publication No. H11-053972).

Note that in an information processing device in which a switch is fixed to a base member provided inside a case, it is envisaged that operation buttons would be assembled to the base member. In such cases, for example, the operation buttons are fixed to the base member by inserting claws provided to the operation buttons into attachment holes formed in the base member. The operation button is positioned with respect to the base member by inserting positioning pins of the operation buttons into positioning holes of the base member.

SUMMARY

According to an aspect of the embodiments, an information processing device includes: a case; a base member that includes an attachment hole and a positioning hole, and that is provided inside the case; a switch that is fixed to the base member; a button member that includes an operation button that moves toward and away from the switch; an anchor member that is provided at the button member, and that includes an insertion tab that is inserted into the attachment hole and a claw that projects out from a leading end side of the insertion tab and that is hooked onto an edge portion of the attachment hole; and a positioning protrusion that is provided at the button member, and that is inserted into the positioning hole, the positioning hole being formed in an elongated hole shape extending along a projection direction of the claw.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Explanation follows regarding an exemplary embodiment of technology disclosed herein.

Information Processing Device

Figure 1:
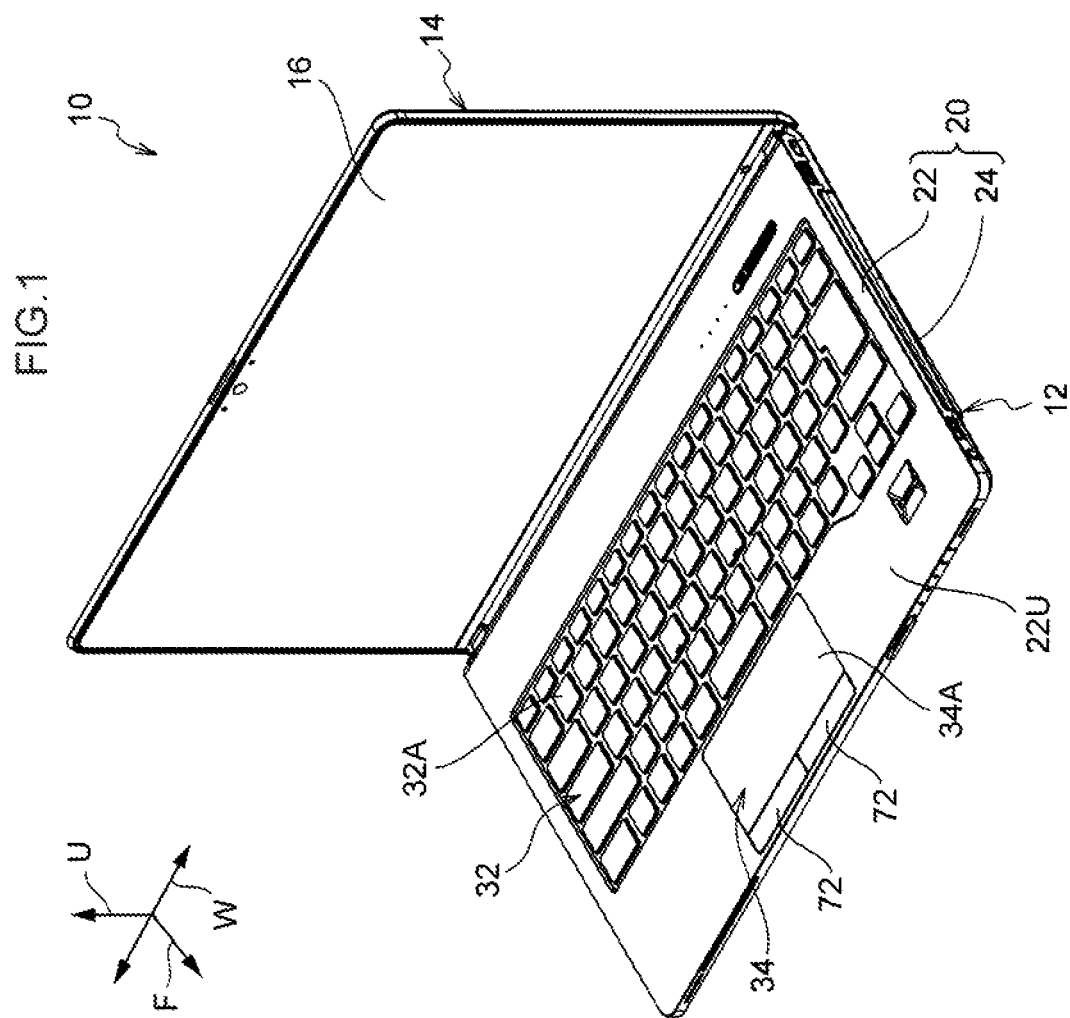
FIG. 1 is a perspective view illustrating an information processing device according to an exemplary embodiment, as viewed from an oblique upper side.

As illustrated in FIG. 1, an information processing device 10 according to the present exemplary embodiment is, for example, configured by a notebook type personal computer. The information processing device 10 includes a main body device (fixed side device) 12, and a display device (movable side device) 14 that is coupled to the main body device 12 so as to be capable of swinging. The display device 14 is, for example, provided with a display 16 such as a liquid crystal display. The display device 14 transitions between a closed state at the main body device 12 side, and an open state away from the main body device 12.

FIG. 1 illustrates the open state in which the display device 14 is away from the main body device 12. In the respective drawings, the arrow U, the arrow F, and the arrows W respectively indicate a height direction upper side, a depth direction front side (front-rear direction front side), and a lateral width direction of the information processing device 10.

The main body device 12 includes a case 20. The case 20 is a thin box body, and is formed in a rectangular shape in plan view. The case 20 includes an upper case 22 and a lower case 24 that are partitioned in a thickness direction of the main body device 12 (in the height direction of the information processing device 10).

Figure 2:
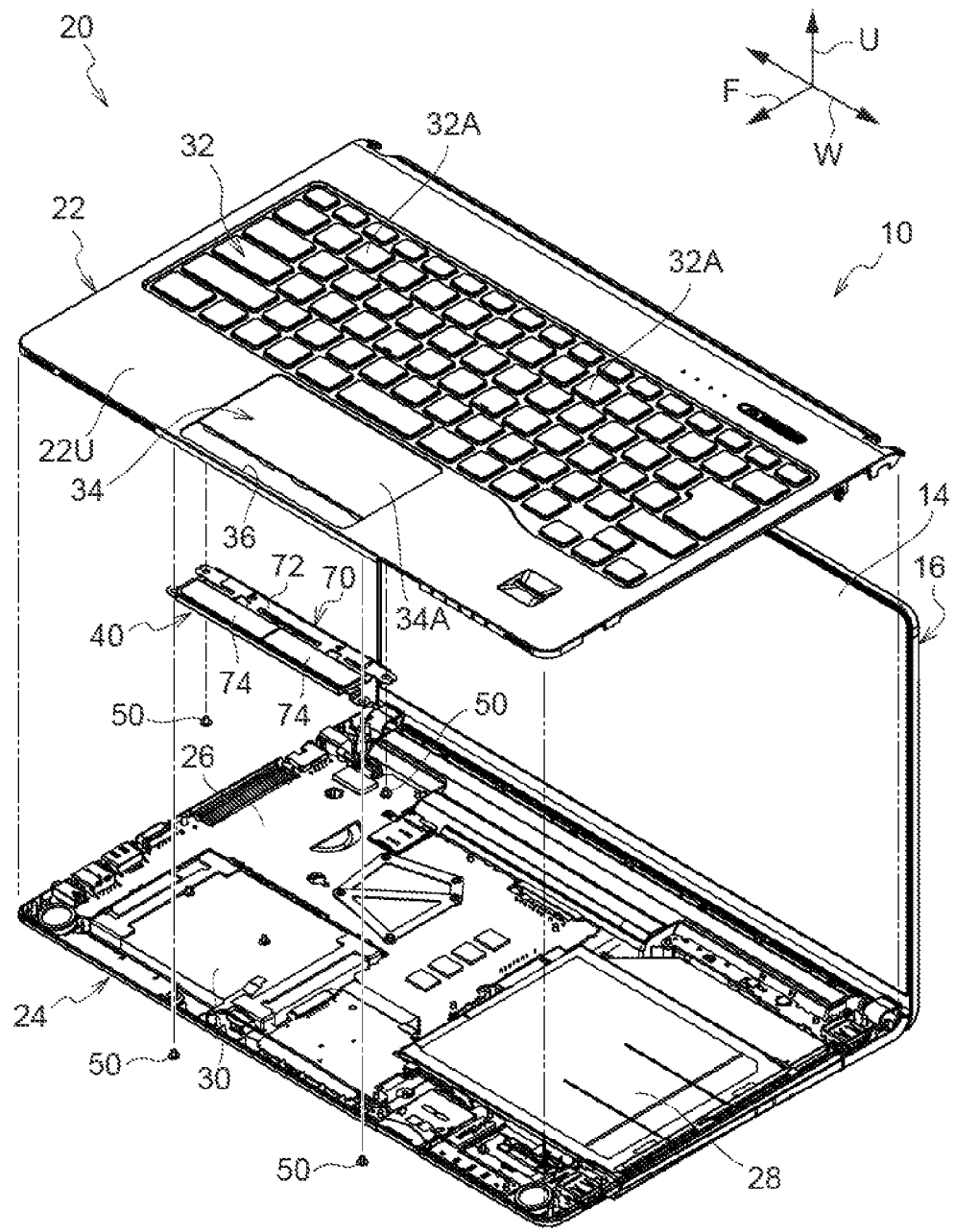
FIG. 2 is an exploded perspective view illustrating the information processing device illustrated in FIG. 1, as viewed from an oblique upper side.

As illustrated in FIG. 2, for example, a printed substrate (main board) 26, an optical disk drive unit 28, and a hard disk drive unit 30 are provided inside the case 20. The case 20 is also provided with a keyboard 32, a touch pad unit 34, a button unit 40, and the like.

The keyboard 32 is formed in a rectangular shape in plan view, and is disposed spanning from a depth direction central portion of the upper case 22 toward the far side. The keyboard 32 includes plural key tops 32A that are exposed from an upper face 22U of the upper case 22. The touch pad unit 34 is disposed on the upper face 22U of the upper case 22 at a front side (the arrow F side) of the keyboard 32. The touch pad unit 34 includes a touch operation face 34A that is operated by a finger of an operator or the like. The touch operation face 34A is formed in a rectangular shape with its length direction in the lateral width direction of the case 20 in plan view, and is exposed from the upper face 22U of the upper case 22.

A button opening 36 that exposes a pair of click buttons 74, described later, is formed in the upper face 22U of the upper case 22 at a front side of the touch pad unit 34. The button opening 36 is formed in an elongated shape extending along a front side end portion of the touch pad unit 34 in the lateral width direction of the case 20 in plan view.

Button Unit

Figure 3:
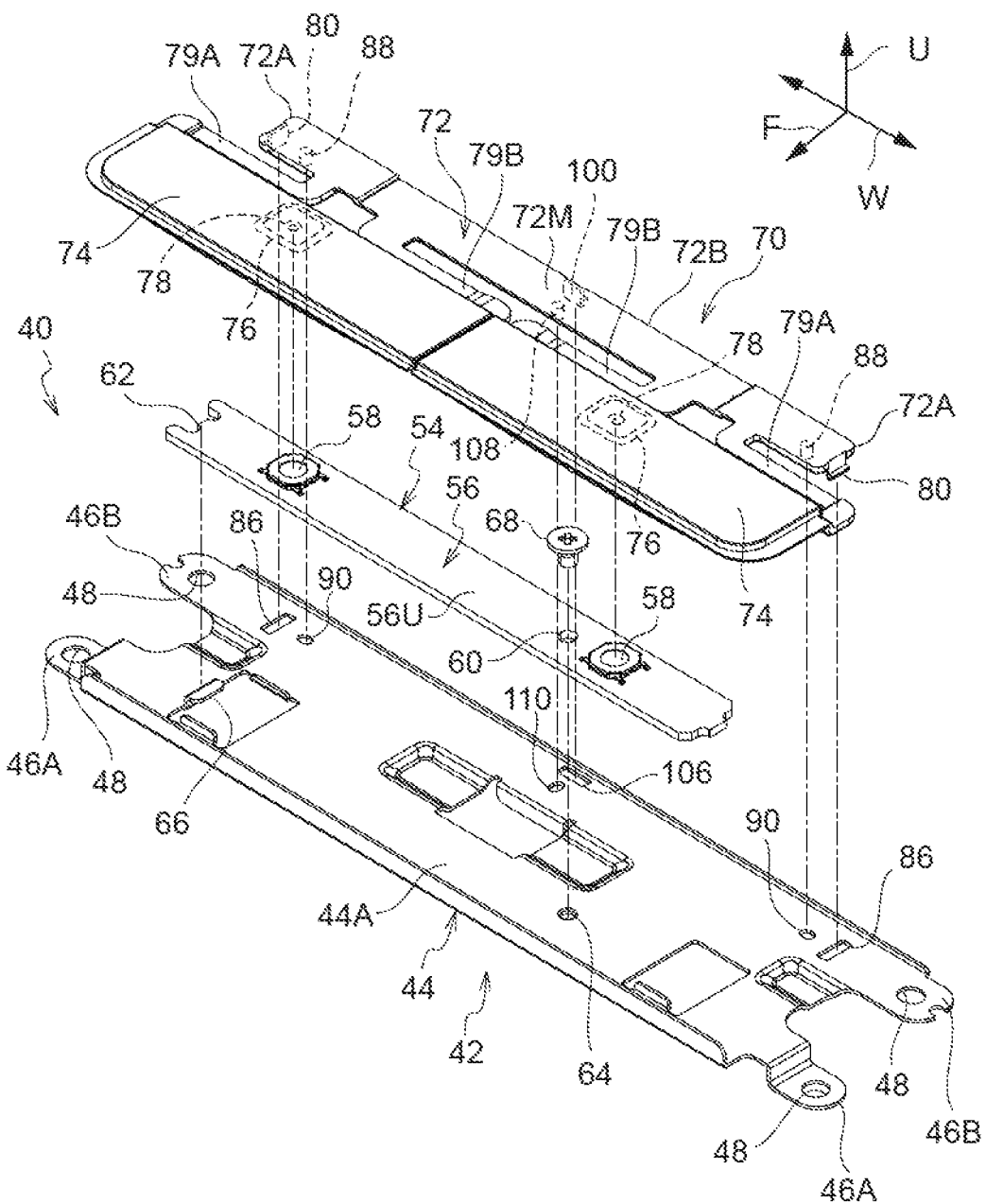
FIG. 3 is an exploded perspective view illustrating a button unit illustrated in FIG. 2, as viewed from an oblique upper side.
Figure 4:
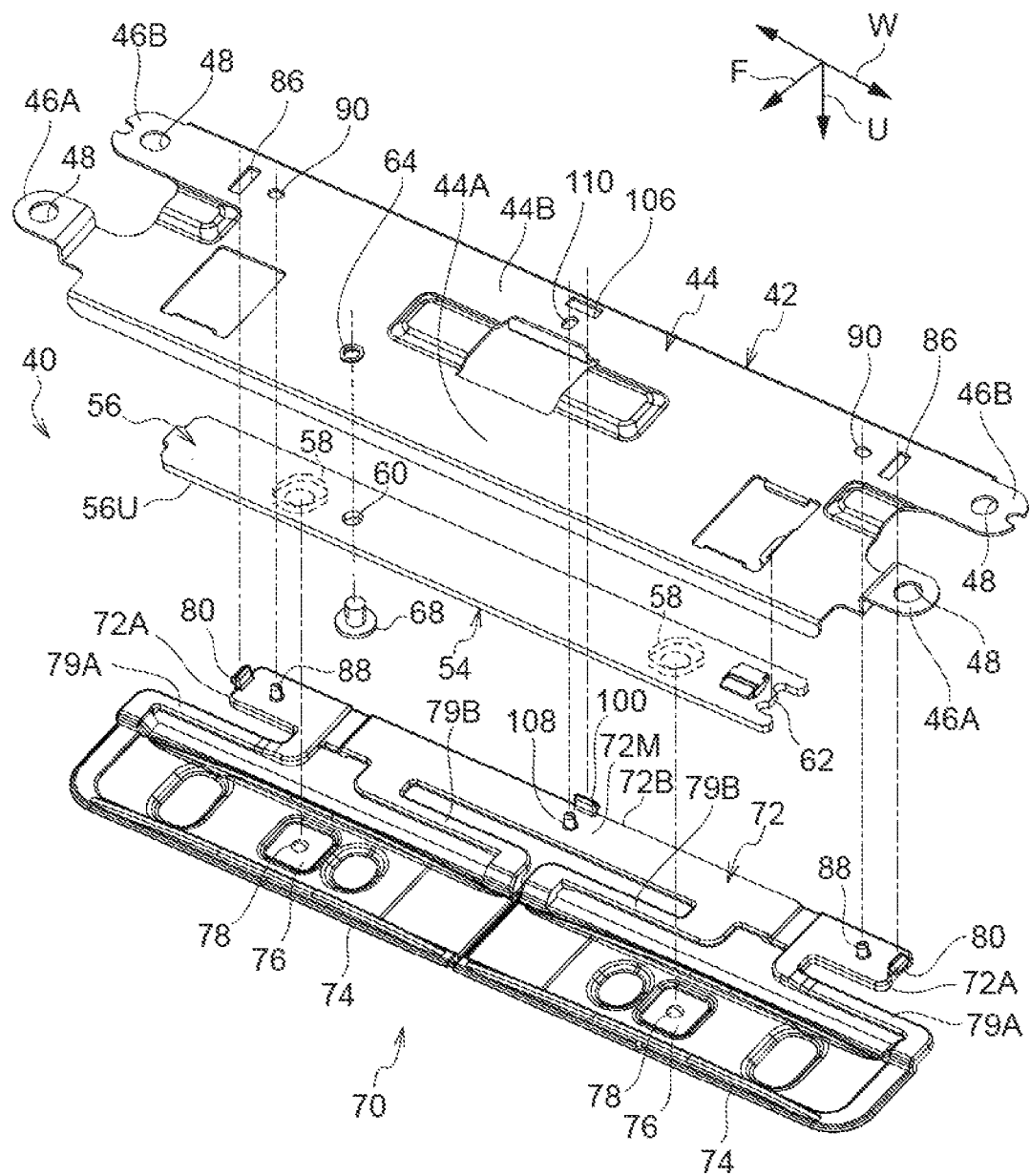
FIG. 4 is an exploded perspective view illustrating the button unit illustrated in FIG. 2, as viewed from an oblique lower side.

The button unit 40 is disposed miming along a front side end portion of the upper case 22. As illustrated in FIG. 3 and FIG. 4, the button unit 40 includes a click base 42, a switch unit 54, and a button member 70. The click base 42 is an example of a base member.

The click base 42 is fixed to the upper case 22 by screws 50 (see FIG. 5) in a state in which the switch unit 54 and the button member 70 are assembled to the click base 42. Namely, the switch unit 54 and the button member 70 are fixed to the case 20 through the click base 42.

Specifically, the click base 42 is, for example, made of metal, and is formed in an elongated shape with its length direction running in the lateral width direction (the arrow W direction) of the case 20 (information processing device 10) in plan view. The click base 42 includes a base body portion 44, a pair of front side fixing portions 46A, and a pair of rear side fixing portions 46B.

Figure 5:
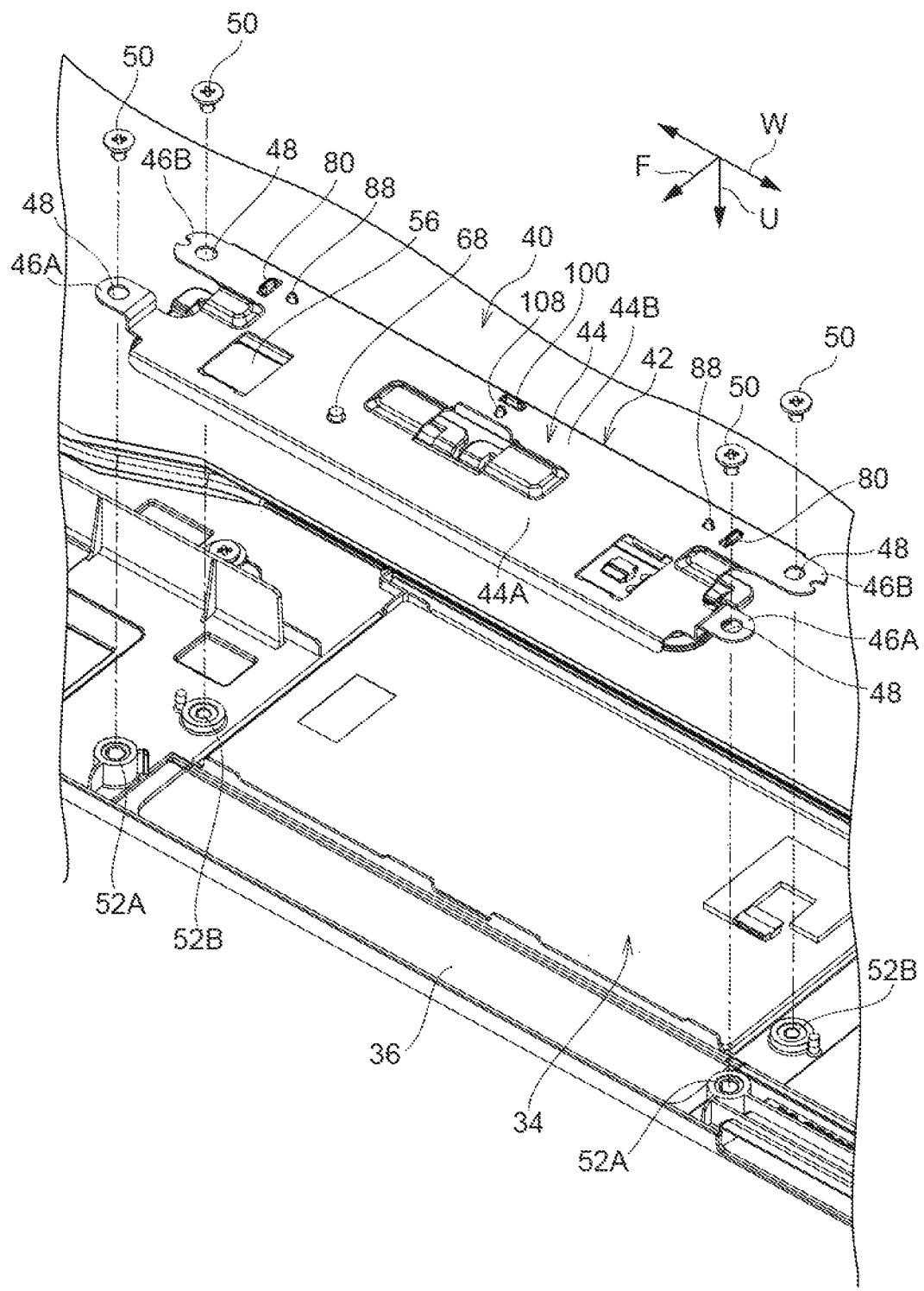
FIG. 5 is an exploded perspective view illustrating an upper case and the button unit illustrated in FIG. 2, as viewed from an oblique lower side.

As illustrated in FIG. 5, the base body portion 44 is disposed spanning between the button opening 36 and the touch pad unit 34 in plan view. The pair of front side fixing portions 46A and the pair of rear side fixing portions 46B are provided at end portions at respective length direction sides of the base body portion 44. The pair of front side fixing portions 46A and the pair of rear side fixing portions 46B are respectively formed with through holes 48 that are penetrated by the screws 50.

The upper case 22 is provided with a pair of front side boss portions 52A and a pair of rear side boss portions 52B. The pair of front side boss portions 52A are disposed at respective length direction sides of the button opening 36. The pair of rear side boss portions 52B are disposed at respective length direction sides of the touch pad unit 34. The pair of front side fixing portions 46A and the pair of rear side fixing portions 46B are respectively fixed to the pair of front side boss portions 52A and the pair of rear side boss portions 52B by the screws 50. Note that as an example, the pair of front side fixing portions 46A of the present exemplary embodiment are fixed to the pair of front side boss portions 52A together with the lower case 24 (see FIG. 2) by the screws 50.

The base body portion 44 includes a switch fixing region 44A that overlaps with the button opening 36 in plan view, and a button fixing region 44B that overlaps with the touch pad unit 34 in plan view. As illustrated in FIG. 3, the switch unit 54 is fixed to the switch fixing region 44A.

The switch unit 54 includes a switch substrate 56 and a pair of switches 58. The switch substrate 56 is formed in an elongated shape extending along the length direction of the click base 42. One length direction end side of the switch substrate 56 is formed with a fixing hole 60 that is penetrated by a screw 68. A projection portion 62 is provided at the other length direction end side of the switch substrate 56.

A screw hole 64 is formed at one length direction end side of the switch fixing region 44A. A hook shaped hooking portion 66 is formed at the other length direction end side of the switch fixing region 44A. The switch substrate 56 overlaps with the click base 42 in a state in which the projection portion 62 of the switch substrate 56 is hooked by the hooking portion 66. In this state, the screw 68 passes through the fixing hole 60 in the switch substrate 56 and is fastened to the screw hole 64. The switch substrate 56 is thereby fixed to the switch fixing region 44A.

The pair of switches 58 are mounted to a mounting face 56U on the opposite side of the switch substrate 56 to the click base 42 (on the upper case 22 side). The pair of switches 58 are disposed at an interval along the length direction of the switch substrate 56, and are disposed facing press portions 78 of the pair of click buttons 74, described later.

The respective switches 58 are, for example, configured by tactile switches such as dome switches. Specifically, the respective switches 58 include reverse springs, fixed contact points, and movable contact points, for example. The reverse springs rebound accompanying a push-down operation by the operator, thereby imparting the operator with a clicking sensation. The movable contact points are provided to the reverse springs. The movable contact points contact the fixed contact points accompanying the push-down operation of the operator. The switches 58 thereby adopt an ON state (a current flow state). When the movable contact points separate from the fixed contact points, the switches 58 adopt an OFF state (a non-current flow state). The pair of switches 58 are electrically connected to the printed substrate (main board) described above, for example through a cable, not illustrated in the drawings, that is connected to the switch substrate 56.

The button member 70 includes a button base 72, a pair of click buttons 74, and plural connector arms 79A, 79B. The button base 72, the pair of click buttons 74, and the plural connector arms 79A, 79B are, for example, integrally formed from a resin with elastic properties (rubber-like properties). The button base 72 is formed in an elongated shape extending along the length direction of the click base 42, and is fixed to the button fixing region 44B of the click base 42. Note that a structure for fixing the button base 72 to the button fixing region 44B will be described later.

The pair of click buttons 74 are disposed in a row along the length direction of the click base 42, and are formed in elongated shapes extending along the length direction of the click base 42. The pair of click buttons 74 oppose the switch fixing region 44A of the click base 42, with the switch unit 54 interposed therebetween. The pair of click buttons 74 are disposed inside the button opening 36 (see FIG. 5), and are exposed from the upper face 22U of the upper case 22. Note that the pair of click buttons 74 are an example of a pair of operation buttons.

As illustrated in FIG. 4, a central portion of a back face (face on the switch unit 54 side) of each of the click buttons 74 is formed with a recess 76 facing toward the switch 58. The press portions 78 are formed at central portions of the recesses 76 so as to face central portions of the switches 58. The press portions 78 project out from bottom wall portions of the recesses 76 in mound shapes.

Each of the click buttons 74 is connected to the button base 72 through a pair of the connector arms 79A, 79B. Each pair of connector arms 79A, 79B extends out from the button base 72 toward the click button 74 side, and is connected to end portions at respective length direction sides of the respective click button 74. The respective click buttons 74 are supported in a cantilevered state to the button base 72 through the pair of connector arms 79A, 79B.

The pairs of connector arms 79A, 79B elastically deform along the direction in which the pair of click buttons 74 and the click base 42 face each other. The press portions 78 of the respective click buttons 74 move toward and away from the switches 58 in conjunction with the elastic deformation of the pairs of connector arms 79A, 79B. When this is performed, the central portions of the switches 58 are pressed down by the press portions 78 of the click buttons 74, temporarily switching the respective switches 58 from the OFF state to the ON state.

Button Member Assembly Structure

Explanation follows regarding an example of a structure for assembling the button member 70 to the click base 42.

As illustrated in FIG. 4, the click base 42 and the button member 70 are assembled in a mutually superimposed state. The button base 72 of the button member 70 is provided with a pair of first anchor members 80 and a second anchor member 100 that anchor to the click base 42. The button base 72 is further provided with a pair of first positioning protrusions 88 and a second positioning protrusion 108 that position the button member 70 with respect to the click base 42. The first anchor members 80 are counterparts to the first positioning protrusions 88, and the second anchor member 100 is a counterpart to the second positioning protrusion 108.

The first anchor members 80 and the second anchor member 100 are examples of anchor members. The first positioning protrusions 88 and the second positioning protrusion 108 are examples of positioning protrusions.

First Anchor Member

Figure 6:
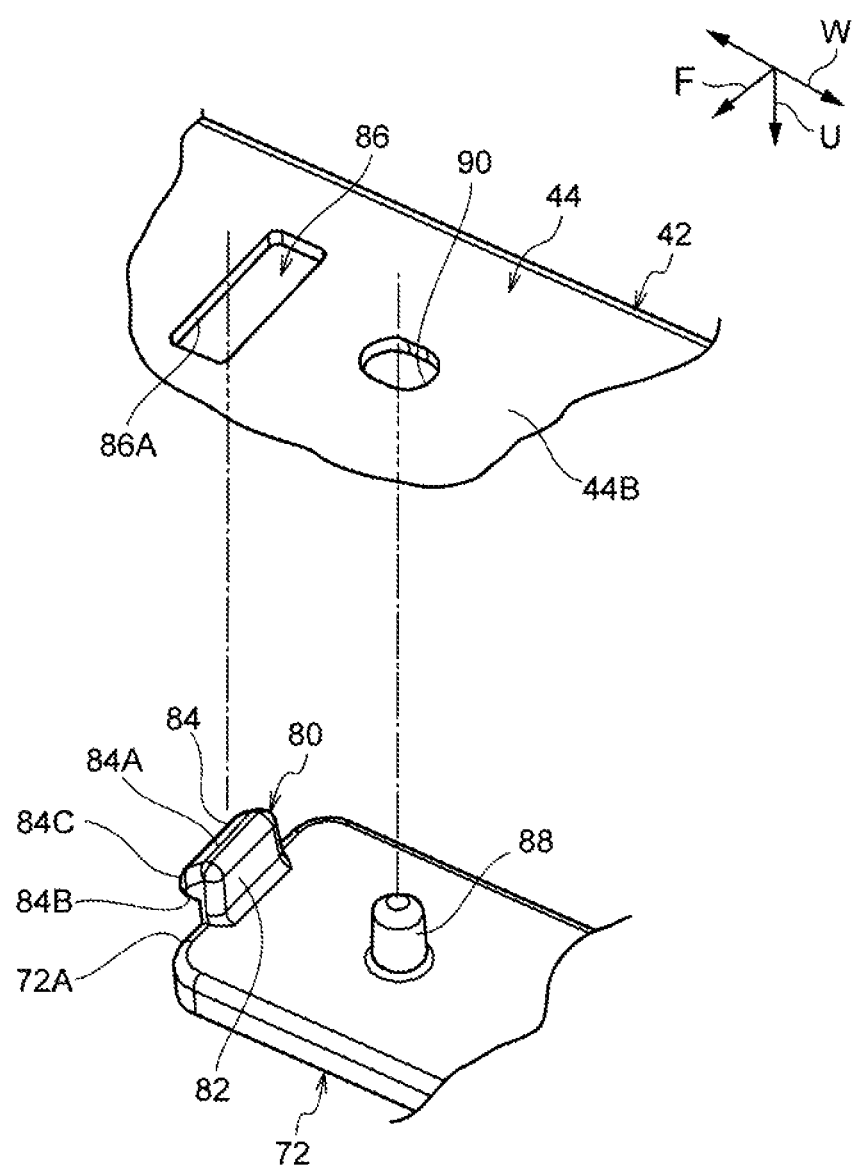
FIG. 6 is an enlargement of part of FIG. 4, illustrating a first anchor member and a first positioning protrusion.

As illustrated in FIG. 6, the pair of first anchor members 80 are provided at end portions 72A at respective length direction (arrow W direction) sides of the button base 72. Each of the first anchor members 80 includes a first insertion tab 82 and a first claw 84. The first insertion tab 82 is an example of an insertion tab, and the first claw 84 is an example of a claw.

The first insertion tab 82 extends out from the end portion 72A of the button base 72 toward the click base 42 side. The first insertion tab 82 is moreover formed in a wall shape extending along the end portion 72A of the button base 72. The first insertion tab 82 is inserted into a first attachment hole 86 formed in the button fixing region 44B of the click base 42. The first attachment hole 86 is formed in an elongated shape extending along the transverse direction (a direction orthogonal to the length direction) of the click base 42. Note that the first attachment hole 86 is an example of an attachment hole.

Figure 7:
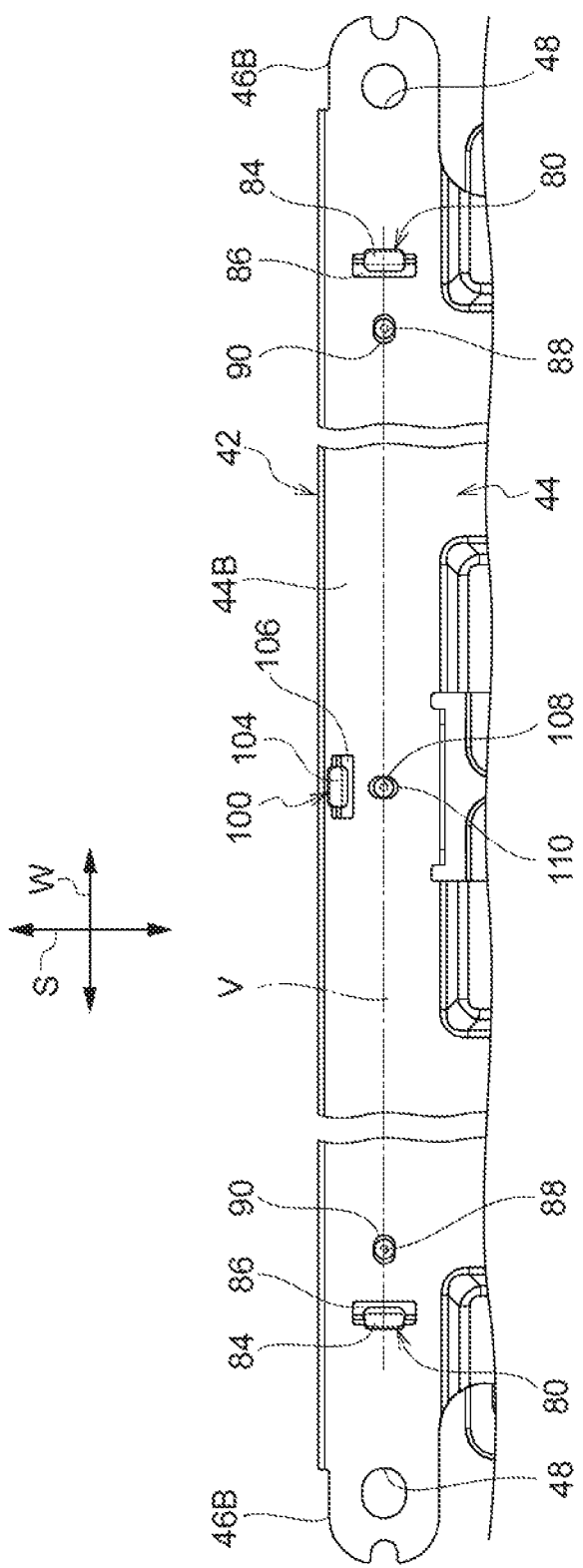
FIG. 7 is a plan view illustrating the button unit illustrated in FIG. 5, as viewed from a lower side.

The first claw 84 is formed at a leading end portion of the first insertion tab 82. The first claw 84 projects out from the leading end portion of the first insertion tab 82 toward the length direction outside of the button base 72 (toward the opposite side of the button base 72 to a length direction central portion 72M). As illustrated in FIG. 7, in the pair of first anchor members 80, the respective first claws 84 are disposed in a state facing toward the length direction outside of the button base 72. Namely, the pair of first anchor members 80 are disposed in a state in which the respective first claws 84 face toward opposite sides from each other.

Figure 8:
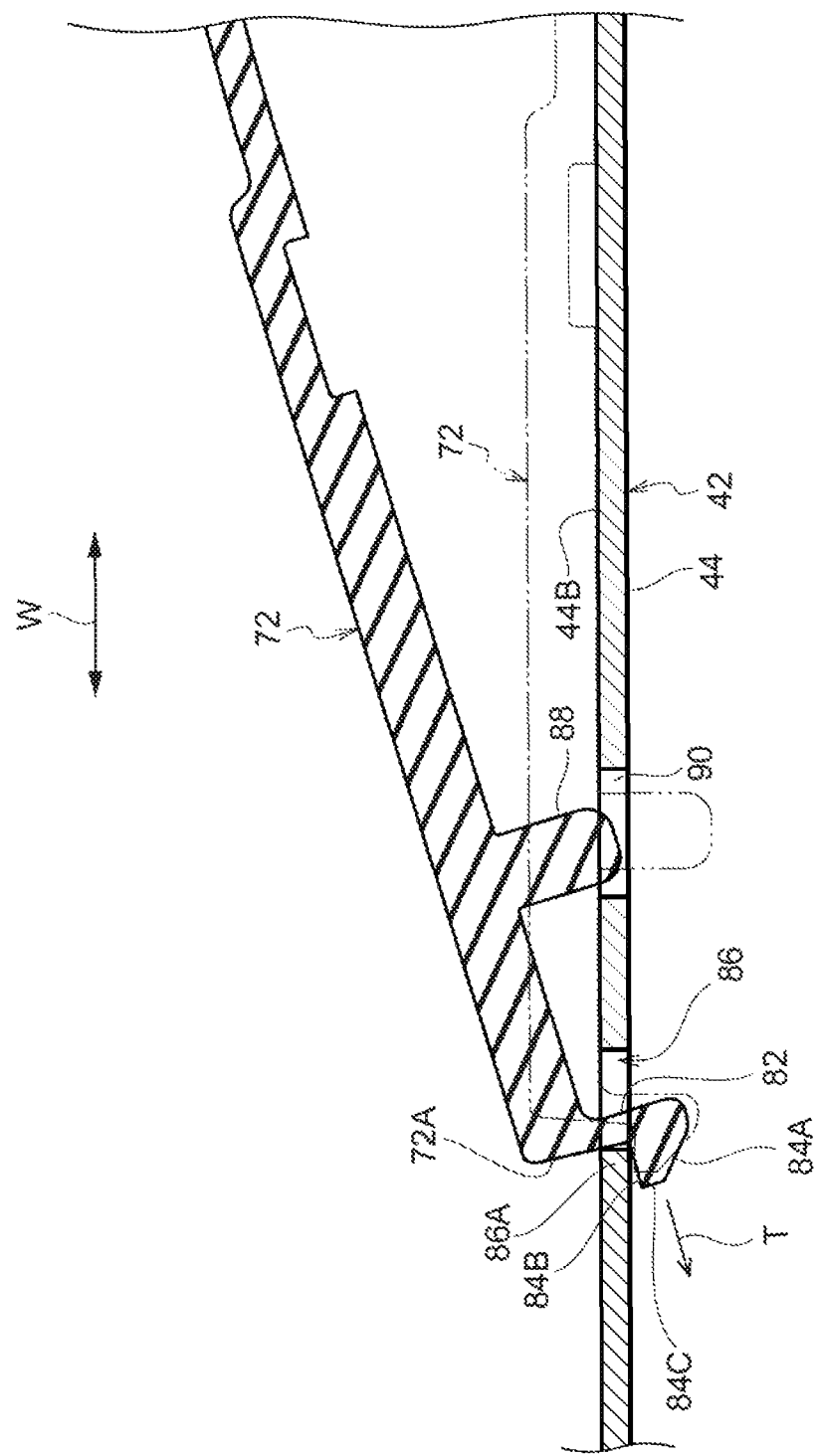
FIG. 8 is a vertical cross-section taken along a length direction of a click base and a button base to explain an assembly sequence of the button base to the click base.

As illustrated in FIG. 8, each first claw 84 includes an inclined face 84A and an anchor face 84B. The inclined face 84A is inclined toward the side of the anchor face 84B on progression from the leading end portion of the first insertion tab 82 toward a projection direction (the arrow T1 direction) leading end portion 84C of the first claw 84.

The anchor face 84B is a face facing toward the button base 72 side. The anchor face 84B is hooked onto an edge portion 86A on the outside of the first attachment hole 86 in a state in which the first claw 84 has passed through the first attachment hole 86. Namely, the anchor face 84B is anchored to the edge portion 86A of the first attachment hole 86 in an assembly direction between the click base 42 and the button base 72 (the thickness direction of the button unit 40).

First Positioning Protrusion

As illustrated in FIG. 7, the pair of first positioning protrusions 88 are disposed between the pair of first anchor members 80. More specifically, each first positioning protrusion 88 is disposed adjacent to the corresponding first anchor member 80 in the length direction of the button base 72, further to the button base 72 length direction (arrow W direction) central portion 72M (see FIG. 4) side than the first anchor members 80. Namely, the first positioning protrusions 88 are disposed in the vicinity of the first anchor members 80. As illustrated in FIG. 6, each of the first positioning protrusions 88 is formed in a circular column shape, and extends out from the button base 72 toward the click base 42 side. The pair of first positioning protrusions 88 are respectively inserted into a pair of first positioning holes 90 formed in the button fixing region 44B of the click base 42.

First Positioning Hole

As illustrated in FIG. 7, the pair of first positioning holes 90 are disposed between the pair of first attachment holes 86 in the click base 42. More specifically, the first positioning holes 90 are disposed adjacent to the respective first attachment holes 86 in the length direction of the click base 42 (the arrow W direction), further to a length direction central portion side of the click base 42 than the first attachment holes 86. Note that the first positioning holes 90 are an example of positioning holes.

Figure 9:
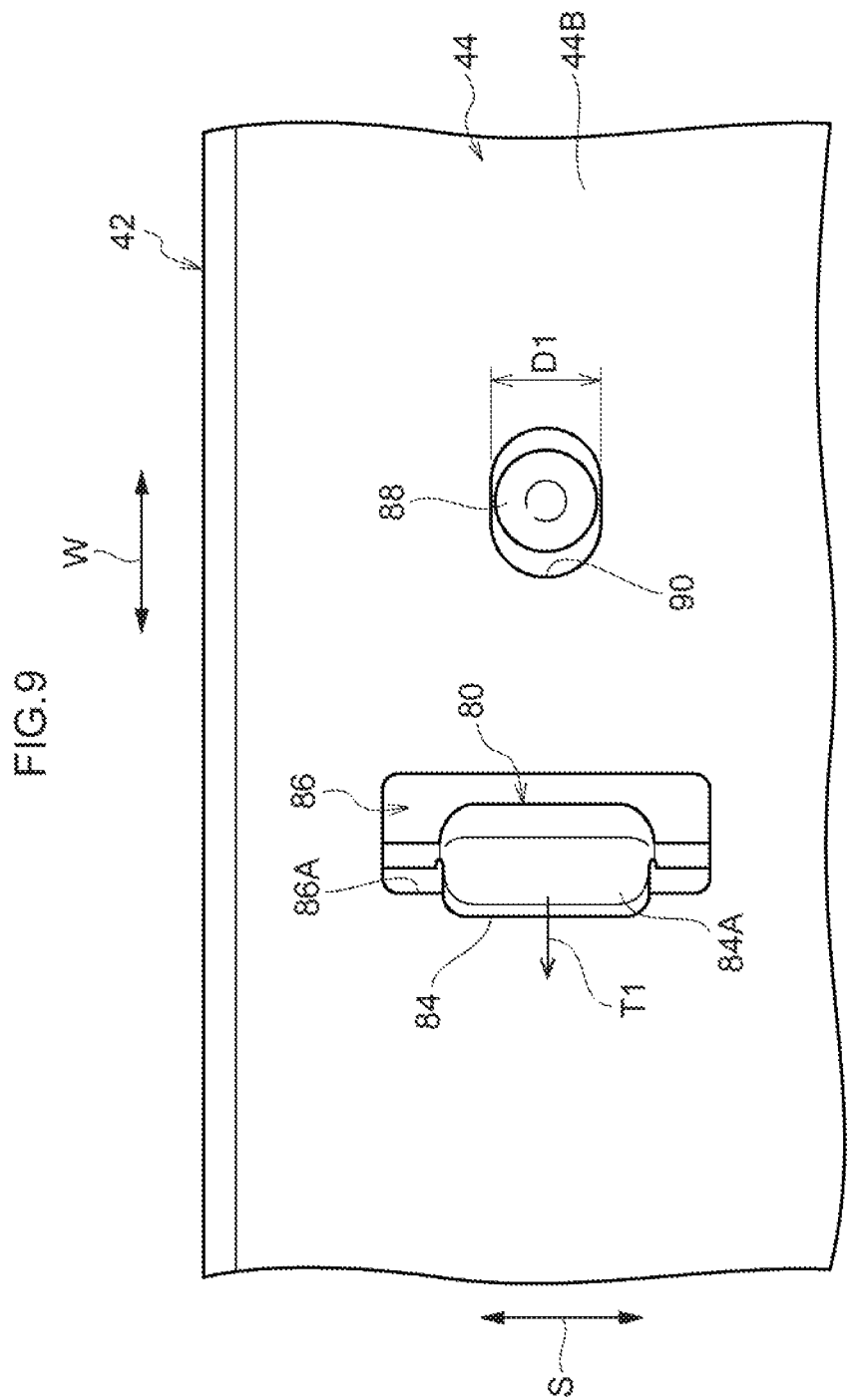
FIG. 9 is a an enlargement of part of FIG. 7, illustrating a first positioning hole.

As illustrated in FIG. 9, each of the first positioning holes 90 is formed in an elongated hole shape extending along the projection direction of the first claw 84. Namely, each of the first positioning holes 90 is formed in an elongated hole shape extending along the length direction of the click base 42. A width D1 of the first positioning holes 90 is slightly larger than the diameter of the first positioning protrusions 88. Accordingly, in a state in which the pair of first positioning protrusions 88 are respectively inserted into the pair of first positioning holes 90, the button member 70 is positioned with respect to the click base 42 in the transverse direction of the click base 42 (the arrow S direction). Namely, in a state in which the pair of first positioning protrusions 88 are respectively inserted into the pair of first positioning holes 90, the button member 70 is positioned with respect to the click base 42 in a direction intersecting the projection direction of the first claw 84.

Second Anchor Member

Figure 10:
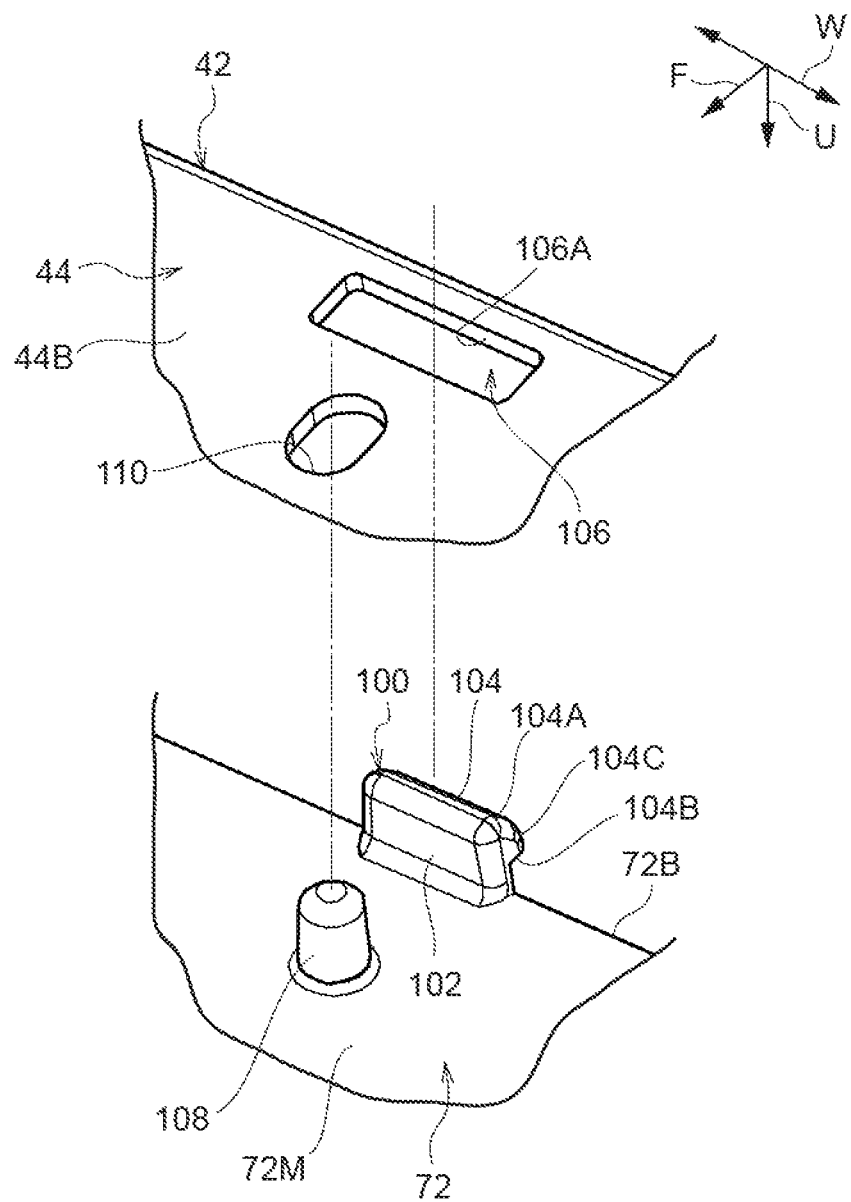
FIG. 10 is a an enlargement of part of FIG. 4, illustrating a second anchor member and a second positioning protrusion.

As illustrated in FIG. 10, the second anchor member 100 is provided at the length direction central portion 72M of the button base 72 at an end portion 72B on the opposite side to the pair of click buttons 74 (see FIG. 4). Note that the second anchor member 100 of the present exemplary embodiment is configured similarly to the first anchor members 80, except for having a different orientation to the first anchor members 80. Accordingly, the following explanation regarding the second anchor member 100 focuses on points that are different to the first anchor members 80.

The second anchor member 100 includes a second insertion tab 102 and a second claw 104. The second insertion tab 102 extends out from the end portion 72B of the button base 72 toward the click base 42 side. The second insertion tab 102 is formed in a wall shape extending from the end portion 72B of the button base 72. The second insertion tab 102 is inserted into a second attachment hole 106 formed in the button fixing region 44B of the click base 42. The second attachment hole 106 is formed in an elongated shape extending in the transverse direction of the click base 42. Note that the second insertion tab 102 is an example of an insertion tab, and the second claw 104 is an example of a claw. The second attachment hole 106 is an example of an attachment hole.

The second claw 104 is formed at a leading end portion of the second insertion tab 102. The second claw 104 projects out from the leading end portion of the second insertion tab 102 toward the transverse direction outside of the button base 72 (the opposite side to the click buttons 74). Namely, the projection direction of the second claw 104 (the arrow T2 direction in FIG. 11) and the projection direction of the first claw 84 (the arrow T1 direction in FIG. 9) intersect each other (are orthogonal to each other in the present exemplary embodiment) as viewed along the thickness direction of the button base 72 (button member 70). The second claw 104 includes an inclined face 104A and an anchor face 104B.

The inclined face 104A is inclined toward the button base 72 side on progression from the leading end portion of the second insertion tab 102 toward a projection direction leading end portion 104C of the second claw 104. The anchor face 104B is a face facing toward the button base 72 side. The anchor face 104B is hooked onto an edge portion 106A on the outside of the second attachment hole 106 in a state in which the second claw 104 has passed through the second attachment hole 106. Namely, the anchor face 104B is anchored to the edge portion 106A of the second attachment hole 106 in the assembly direction between the click base 42 and the button base 72 (thickness direction of the button unit 40).

Second Positioning Protrusion

As illustrated in FIG. 10, the second positioning protrusion 108 is disposed adjacent to the second anchor member 100 in the transverse direction of the button base 72 (in the arrow S direction), further to a transverse direction central portion side of the button base 72 than the second anchor member 100. Namely, the second positioning protrusion 108 is disposed in the vicinity of the second anchor member 100. Moreover, the second positioning protrusion 108 is formed in a circular column shape, and extends out from the button base 72 toward the click base 42 side. The second positioning protrusion 108 is inserted into a second positioning hole 110 formed in the button fixing region 44B of the click base 42. Moreover, as illustrated in FIG. 7, the second positioning protrusion 108 and the pair of first positioning protrusions 88 described above are disposed along a hypothetical straight line V running along the length direction of the click base 42.

Second Positioning Hole

Figure 11:
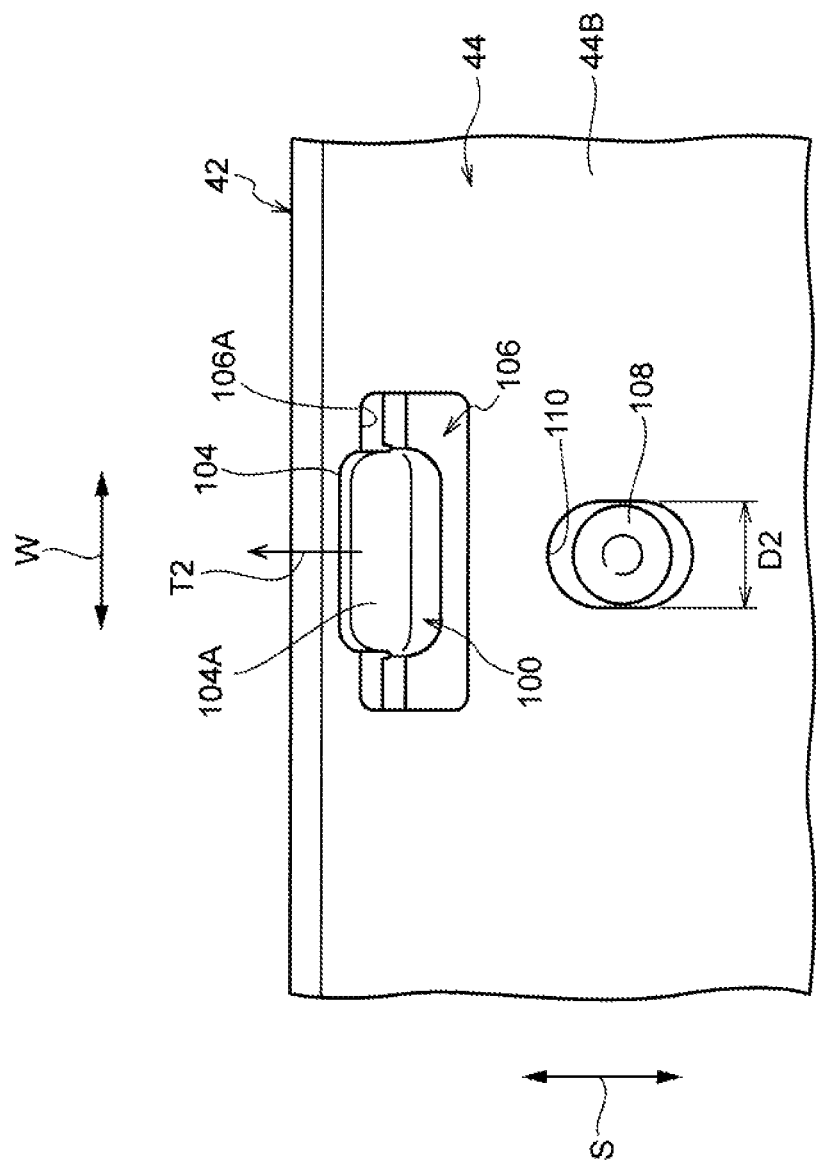
FIG. 11 is a an enlargement of part of FIG. 7, illustrating a second positioning hole.

As illustrated in FIG. 11, the second positioning hole 110 is disposed adjacent to the second attachment hole 106 in the transverse direction of the click base 42, further to a transverse direction central portion side of the click base 42 than the second attachment hole 106. Moreover, the second positioning hole 110 is formed in an elongated hole shape extending along the projection direction of the second claw 104 (the arrow T2 direction). Namely, the second positioning hole 110 is formed in an elongated hole shape extending along the transverse direction of the click base 42.

A width D2 of the second positioning hole 110 is slightly larger than the diameter of the second positioning protrusion 108. Accordingly, in a state in which the second positioning protrusion 108 has been inserted into the second positioning hole 110, the button member 70 is positioned with respect to the click base 42 in the length direction of the click base 42. Namely, in a state in which the second positioning protrusion 108 has been inserted into the second positioning hole 110, the button member 70 is positioned with respect to the click base 42 in a direction intersecting the projection direction of the second claw 104. Note that the second positioning hole 110 is an example of a positioning hole.

Next, explanation follows regarding operation and advantageous effects of the present exemplary embodiment.

First, explanation follows regarding a method for attaching the button unit 40 to the case 20.

As illustrated in FIG. 4, the button unit 40 includes the click base 42, the switch unit 54, and the button member 70. The switch unit 54 and the button member 70 are assembled to the click base 42. In this state, the pair of click buttons 74 of the button member 70 are disposed inside the button opening 36 (see FIG. 2) from the inside of the upper case 22. Then, as illustrated in FIG. 5, the pair of front side fixing portions 46A and the pair of rear side fixing portions 46B of the click base 42 are fixed to the pair of front side boss portions 52A and the pair of rear side boss portions 52B of the upper case 22 by the respective screws 50.

Note that the following concern arises in a comparative example of a case in which, for example, screws are used to jointly fasten the click base 42 and the button member 70 to the upper case 22. Namely, in cases in which the click base 42 and the button member 70 are each positioned separately with respect to the upper case 22, positional displacement of the press portions 78 of the pair of click buttons 74 with respect to the pair of switches 58 is liable to occur. Moreover, if positional displacement of the press portions 78 of the pair of click buttons 74 with respect to the pair of switches 58 occurs, there is a possibility that the operator will not be imparted with a specific operation feel (clicking sensation) when the operator presses down either of the pair of click buttons 74.

In contrast, in the present exemplary embodiment, the switch unit 54 and the button member 70 are positioned with respect to the click base 42. Specifically, as illustrated in FIG. 3, the click base 42 includes the switch fixing region 44A and the button fixing region 44B. The switch unit 54 is fixed to the switch fixing region 44A. Namely, the pair of switches 58 of the switch unit 54 are positioned with respect to the click base 42. The button base 72 of the button member 70 is fixed to the button fixing region 44B. Namely, the pair of click buttons 74 of the button member 70 are positioned with respect to the click base 42.

Accordingly, in the present exemplary embodiment, the button member 70 is directly positioned with respect to the click base 42 to which the switch unit 54 is fixed, without involving the upper case 22. As a result, in the present exemplary embodiment, positional displacement of the press portions 78 of the click buttons 74 with respect to the switches 58 is reduced in comparison to in the comparative example described above. This thereby enables the operator to be imparted with the specific operation feel when the operator presses down either of the pair of click buttons 74.

Next, explanation follows regarding a method for attaching the button member 70 to the click base 42.

As illustrated in FIG. 4, the button member 70 is fixed to the click base 42 by the pair of first anchor members 80 and the second anchor member 100 provided at the button base 72. The button member 70 is moreover positioned with respect to the click base 42 by the pair of first positioning protrusions 88 and the second positioning protrusion 108 provided the button base 72.

Specifically, the pair of first anchor members 80 are provided at the end portions 72A at respective length direction end sides of the button base 72. As illustrated in FIG. 7, the pair of first anchor members 80 are disposed in a state in which the respective first claws 84 face toward opposite sides from each other. Namely, the pair of first anchor members 80 are disposed in a state in which each of the first claws 84 faces toward the length direction outside of the button base 72.

First, as illustrated in FIG. 8, the first claws 84 of the first anchor members 80 are inserted into (penetrate) the first attachment holes 86 of the click base 42. When this is performed, the button base 72 is bent so as to bulge toward the opposite side to the click base 42. This facilitates insertion of the first claws 84 into the first attachment holes 86.

Next, when the bent button base 72 recovers its original shape (natural state), as illustrated by double-dotted intermittent lines, the anchor faces 84B of the first claws 84 hook onto the edge portions 86A of the first attachment holes 86. The end portions 72A at respective length direction end sides of the button base 72 are thereby fixed to the click base 42. When this is performed, the pair of first positioning protrusions 88 of the button base 72 are respectively inserted into the pair of first positioning holes 90 of the click base 42. The button base 72 is thereby positioned with respect to the click base 42 in the transverse direction of the click base 42 (the arrow S direction in FIG. 7).

Note that when the first claws 84 pass through (penetrate) the first attachment holes 86 and are hooked onto the edge portions 86A of the first attachment holes 86, the first anchor members 80 move in the length direction of the button base 72 (the arrow W direction) with respect to the edge portions 86A. There is a possibility of the button base 72 moving along its length direction accompanying this movement of the first anchor members 80. In particular, in the present exemplary embodiment, the first insertion tabs 82 are short and do not readily undergo elastic deformation, and so the movement amount of the button base 72 in its length direction is liable to become large. There is accordingly a concern that it may become difficult for the first positioning protrusions 88 provided at the button base 72 to enter the first positioning holes 90.

As a countermeasure to this issue, as illustrated in FIG. 9, the first positioning holes 90 of the present exemplary embodiment are formed in elongated hole shapes extending along the projection direction of the first claws 84 (the arrow T1 direction). Namely, the first positioning holes 90 are formed in elongated hole shapes extending along the length direction of the button base 72. This facilitates insertion of the first positioning protrusions 88 into the first attachment holes 86, even if the button base 72 has moved along its length direction accompanying insertion of the first claws 84 into the first attachment holes 86 as described above. The present exemplary embodiment thereby enables easy insertion of the first positioning protrusions 88 into the first positioning holes 90 while inserting the first claws 84 into the first attachment holes 86.

The second anchor member 100 is provided at the end portion 72B at the length direction central portion 72M of the button base 72. The second claw 104 of the second anchor member 100 projects out from the leading end portion of the second insertion tab 102 toward the transverse direction outside of the button base 72. When the second claw 104 is inserted into the second attachment hole 106 of the click base 42, the anchor face 104B of the second claw 104 hooks onto the edge portion 106A of the second attachment hole 106. The end portion 72B of the button base 72 is thereby fixed to the click base 42. When this is performed, the second positioning protrusion 108 of the button base 72 is inserted into the second positioning hole 110 of the click base 42. The button base 72 is thereby positioned with respect to the click base 42 in the length direction of the click base 42 (the arrow W direction).

Note that when the second claw 104 passes through (penetrates) the second attachment hole 106, and is hooked onto the edge portion 106A of the second attachment hole 106, the second anchor member 100 moves in the transverse direction of the button base 72 (the arrow S direction) with respect to the edge portion 106A. There is a possibility of the button base 72 moving along its transverse direction accompanying this movement of the second anchor member 100. In particular, in the present exemplary embodiment, the second insertion tab 102 is short and does not readily undergo elastic deformation, and so the movement amount of the button base 72 in its transverse direction is liable to become large. There is accordingly a concern that it may become difficult for the second positioning protrusion 108 provided at the button base 72 to enter the second positioning hole 110.

As a countermeasure to this issue, as illustrated in FIG. 11, the second positioning hole 110 of the present exemplary embodiment is formed in an elongated hole shape extending along the projection direction of the second claw 104 (the arrow T2 direction). Namely, the second positioning hole 110 is formed in an elongated hole shape extending along the transverse direction of the button base 72. This facilitates insertion of the second positioning protrusion 108 into the second attachment hole 106, even if the button base 72 has moved along its transverse direction accompanying insertion of the second claw 104 into the second attachment hole 106 as described above. The present exemplary embodiment thereby enables easy insertion of the second positioning protrusion 108 into the second positioning hole 110 while inserting the second claw 104 into the second attachment hole 106.

Accordingly, in the present exemplary embodiment, each of the first positioning holes 90 and the second positioning hole 110 are formed in elongated hole shapes extending along the respective projection directions of the first claws 84 and the second claw 104, thereby facilitating assembly of the button base 72 to the click base 42.

In a comparative example, for example a case in which the first positioning holes 90 are circular in shape (true circles), there is a possibility of the first claws 84 catching on the edge portions 86A of the first attachment holes 86 in an elastically deformed state of the first insertion tabs 82 of the first anchor members 80. In contrast, in the present exemplary embodiment, the first positioning holes 90 are formed in elongated hole shapes as described above, thereby facilitating recovery of the first insertion tab 82 from elastic deformation. The durability of the first anchor members 80 is thereby improved. Similarly, the second positioning hole 110 is formed in an elongated hole shape, thereby improving the durability of the second anchor member 100 as well.

Moreover, in the present exemplary embodiment, the pair of first positioning protrusions 88 are disposed between the pair of first anchor members 80. Namely, the first positioning protrusions 88 are disposed at the opposite side of the first anchor members 80 from the first claws 84. This thereby enables easy insertion of the pair of first positioning protrusions 88 into the pair of first positioning holes 90 while inserting the pair of first anchor members 80 into the pair of first attachment holes 86 in a bent state of the button base 72. This thereby further facilitates assembly of the button base 72 to the click base 42.

Moreover, in the present exemplary embodiment, the button base 72 is positioned with respect to the click base 42 in the length direction and in the transverse direction of the click base 42 by the pair of first positioning protrusions 88 and the second positioning protrusion 108. This thereby improves the positioning precision of the press portions 78 of the pair of click buttons 74 with respect to the pair of switches 58.

Moreover, the pair of first positioning protrusions 88 and the second positioning protrusion 108 are disposed along the straight line V (see FIG. 7). Processing precision of the pair of first positioning protrusions 88 and the second positioning protrusion 108 is accordingly improved, thereby suppressing positional displacement between the pair of first positioning protrusions 88 and the second positioning protrusion 108. The positioning precision of the button base 72 with respect to the click base 42 is improved as a result. The positioning precision of the press portions 78 of the pair of click buttons 74 with respect to the pair of switches 58 is thereby further improved.

The length direction central portion 72M of the button base 72 readily deforms (bends) in the thickness direction of the button base 72 (the arrow U direction in FIG. 3), but does not readily deform (bend) in the transverse direction of the button base 72 (the arrow F direction in FIG. 3 and the arrow S direction in FIG. 7). The second claw 104 of the second anchor member 100 accordingly does not readily come away from the edge portion 106A of the second attachment hole 106.

In the present exemplary embodiment, the button base 72 is fixed to the click base 42 at the three points of the pair of first anchor members 80 and the second anchor member 100. Accordingly, in the present exemplary embodiment, the button base 72 comes away from the click base 42 less readily than in cases in which, for example, the button base 72 is only fixed to the click base 42 at the two points of the pair of first anchor members 80.

In particular, for example, the button unit 40 of the present exemplary embodiment is placed in a state in which the button member 70 is at the bottom when fixing the button unit 40 to the upper case 22 with the screws 50. When this is performed, there would be a possibility of the length direction central portion 72M of the button base 72 flexing downward if the button base 72 were only fixed to the click base 42 at the two points of the pair of first anchor members 80.

In contrast, in the present exemplary embodiment, the length direction central portion 72M of the button base 72 is fixed to the click base 42 by the second anchor member 100, thereby suppressing flexing of the length direction central portion 72M of the button base 72. This thereby facilitates attachment of the button unit 40 to the upper case 22.

In the present exemplary embodiment, the button member 70 is fixed to the click base 42 by the pair of first anchor members 80 and the second anchor member 100. Accordingly, in the present exemplary embodiment, the number of components is reduced in comparison to cases in which, for example, the button member 70 is fixed to the click base 42 by screws. The number of assembly steps of the button unit 40 is thereby reduced, enabling a reduction in costs. A reduction in weight of the button unit 40 can also be achieved.

Note that in an information processing device in which a switch is fixed to a base member provided inside a case, it is envisaged that operation buttons would be assembled to the base member. In such cases, for example, the operation buttons are fixed to the base member by inserting claws provided at the operation buttons into attachment holes formed in the base member. The operation button is positioned with respect to the base member by inserting positioning pins of the operation buttons into positioning holes of the base member.

However, there is a possibility that it could be hard work to insert the positioning pins of the operation buttons into the positioning holes of the base member while inserting the claws of the operation buttons into the attachment holes of the base member.

Regarding this point, an aspect of technology disclosed herein enables assembly of the operation buttons to the base member to be facilitated.

Explanation follows regarding modified examples of the exemplary embodiment described above.

Figure 12:
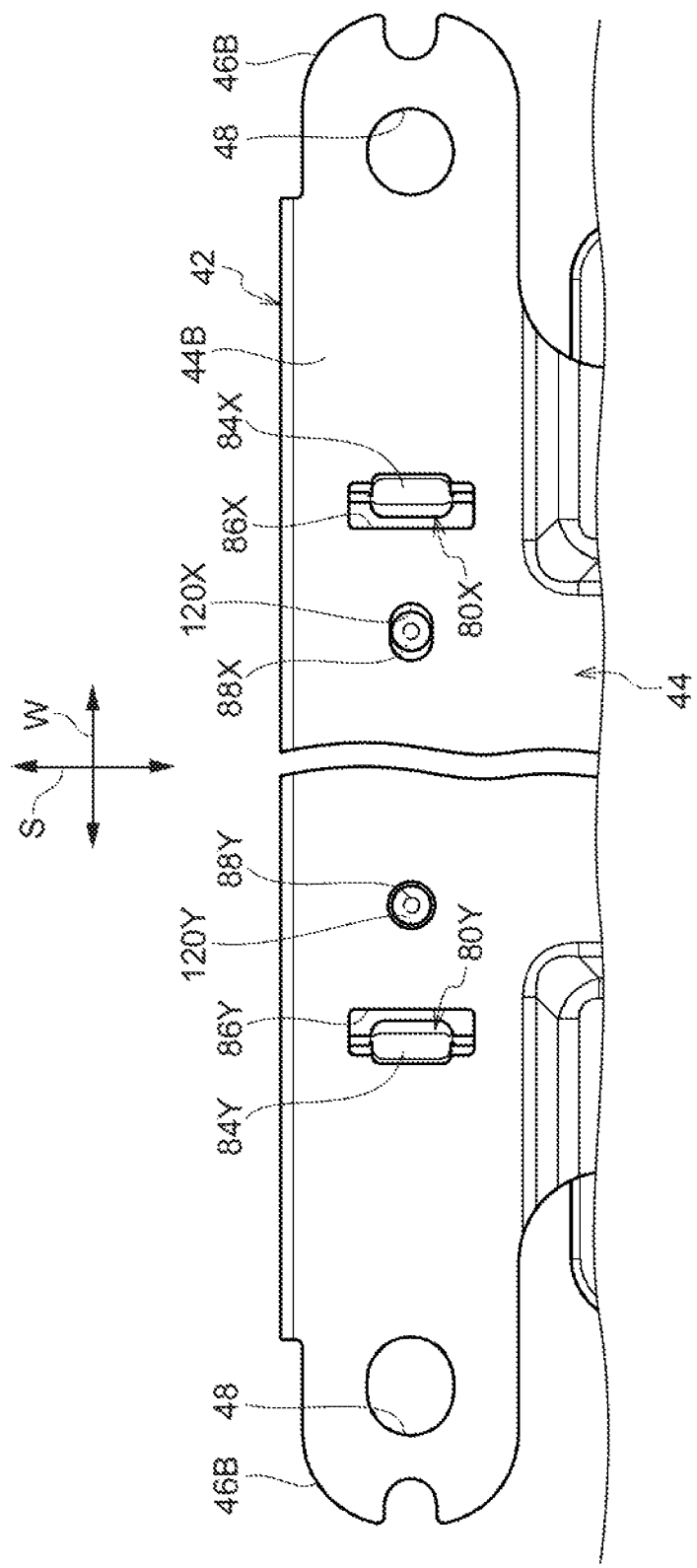
FIG. 12 is a plan view illustrating a modified example of a button unit according to an exemplary embodiment, as viewed from a lower side.

In the exemplary embodiment described above, the button base 72 is fixed to the click base 42 at the three points of the pair of first anchor members 80 and the second anchor member 100; however, the exemplary embodiment described above is not limited thereto. For example, as illustrated in FIG. 12, the button base 72 may be fixed to the click base 42 at the two points of a pair of anchor members 80X, 80Y in such cases, for example, out of a pair of positioning holes 120X, 120Y into which a pair of positioning protrusions 88X, 88Y are respectively inserted, one positioning hole 120X is formed in an elongated hole shape extending along the projection direction of a claw 84X, and the other positioning hole 120Y is formed in a circular shape (true circle). This thereby enables easy insertion of one anchor member 80X into one attachment hole 86X while positioning the button base 72 with respect to the click base 42 in both the length direction of the click base 42 (the arrow W direction) and the transverse direction of the click base 42 (the arrow S direction).

If the other positioning hole 120Y is formed in a circular shape, there is a possibility that insertion of the other anchor member 80Y into another attachment hole 86Y could be difficult. In such cases, consideration may be given to making the other anchor member 80Y easier to elastically deform. Moreover, consideration may be given to fixing the button base 72 to the click base 42 using another fixing member such as a screw, instead of the anchor member 80Y, on the side of the other positioning hole 120Y.

Moreover, for example, the button base 72 may be provided with a pair of second anchor members facing each other along the transverse direction of the button base 72. The number and placement of the anchor members may also be modified as appropriate.

In the exemplary embodiment described above, the first claws 84 project out from the first insertion tabs 82 toward the length direction outside of the button base 72. However, the first claws 84 may project out from the first insertion tabs 82 toward the length direction inside of the button base 72 (toward the central portion 72M side). Similarly, in the exemplary embodiment described above, the second claw 104 projects out from the second insertion tab 102 toward the transverse direction outside of the button base 72. However, the second claw 104 may project out toward the transverse direction inside of the button base 72 (the central portion side).

In the exemplary embodiment described above, the pair of first positioning protrusions 88 and the second positioning protrusion 108 are disposed along the straight line V; however, the pair of first positioning protrusions 88 and the second positioning protrusion 108 do not have to be disposed along a straight line.

In the exemplary embodiment described above, the first anchor members 80 and the first positioning protrusions 88 are disposed adjacent to each other in the length direction of the button base 72; however, the exemplary embodiment described above is not limited thereto. For example, the first anchor members 80 and the first positioning protrusions 88 may be disposed offset from each other in the transverse direction of the button base 72. Moreover, the first positioning protrusions 88 may be disposed at a position away from the first anchor members 80 rather than in the vicinity of the first anchor members 80. Similarly, the second anchor member 100 and the second positioning protrusion 108 may, for example, be disposed offset from each other in the length direction of the button base 72. Moreover, the second positioning protrusion 108 may be disposed at a position away from the second anchor member 100 rather than in the vicinity of the second anchor member 100.

In the exemplary embodiment described above, the first anchor members 80 and the second anchor member 100 are configured similarly to each other. However, the first anchor members 80 and the second anchor member 100 may be configured differently to each other.

In the exemplary embodiment described above, the switch substrate 56 is fixed to the click base 42. However, the switches 58 may be fixed to the click base 42. Moreover, the switches 58 are not limited to tactile switches, and may be configured by other switches. Moreover, the operation buttons are not limited to the click buttons 74, and may be configured by other operation buttons.

In the exemplary embodiment described above, the button unit 40 is applied to the information processing device 10 configured by a notebook type personal computer. However, the button unit 40 may be applied to another information processing device.

Explanation has been given regarding one exemplary embodiment of technology disclosed herein. However, the technology disclosed herein is not limited to the exemplary embodiment described above. The exemplary embodiment described above may be employed in combination with the respective modified examples, and obviously various configurations may be implemented within a range not departing from the spirit of the technology disclosed herein.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing device, comprising:
   a case;
   a base member that includes an attachment hole and a positioning hole, and that is provided inside the case;
   a switch that is fixed to the base member;
   a button member that includes an operation button that moves toward and away from the switch;
   an anchor member that is provided at the button member, and that includes an insertion tab that is inserted into the attachment hole and a claw that projects out from a leading end side of the insertion tab in a projection direction and that is hooked onto an edge portion of the attachment hole; and
   a positioning protrusion that is provided at the button member, and that is inserted into the positioning hole, the positioning hole being formed in an elongated hole shape, the longest dimension of the elongated hole extending along the projection direction of the claw.

2. The information processing device of claim 1, wherein, in an inserted state of the positioning protrusion into the positioning hole, the positioning protrusion positions the button member with respect to the base member in a direction intersecting the projection direction of the claw.

3. The information processing device of claim 1, wherein the positioning protrusion is disposed at an opposite side of the anchor member from the claw.

4. The information processing device of claim 1, wherein:
   the author member comprises a pair of anchor members disposed at an interval along a length direction of the button member;
   the positioning protrusion comprises a pair of positioning protrusions disposed between the pair of author members;
   the pair of anchor members are disposed in a state in which the respective claws face toward opposite sides from each other; and
   the pair of positioning protrusions are respectively inserted into a pair of the positioning holes formed in the base member.

5. The information processing device of claim 4, wherein the pair of positioning holes are formed in elongated hole shapes extending along a length direction of the button member.

6. The information processing device of claim 4, wherein the pair of anchor members are provided at end portions at respective length direction sides of the button member.

7. An information processing device, comprising:
   a case;
   a base member that includes attachment holes, a pair of first positioning holes and a second positioning hole, and that is provided inside the case;
   a switch that is fixed to the base member;
   a button member that includes an operation button that moves toward and away from the switch;
   a pair of first anchor members and a second anchor member that are each provided at the button member, and that each includes an insertion tab that is inserted into one of the attachment holes and a claw that projects out from a leading end side of the insertion tab in a projection direction and that is hooked onto an edge portion of one of the attachment holes; and
   a pair of first positioning protrusions and a second positioning protrusion that are each provided at the button member; and that are respectively inserted into the pair of first positioning holes and the second positioning hole, wherein:
   the pair of first anchor members are disposed at an interval along a length direction of the button member and are disposed in a state in which the respective claws face toward opposite sides from each other,
   the pair of first positioning protrusions are disposed between the pair of first anchor members and are respectively disposed in the vicinity of the pair of first anchor members,
   the claw of the second anchor member projects out in a direction intersecting a projection direction of the claws of the pair of first anchor members as viewed along a thickness direction of the button member, the second positioning protrusion is disposed in the vicinity of the second anchor member, and the pair of first positioning holes are each formed in an elongated hole shape the longest dimension of the elongated hole extending along the projection direction of the claw of the first anchor member, and the second positioning hole formed in an elongated hole shape, the longest dimension of the elongated hole extending along a direction perpendicular to the projection direction of the claw of the first anchor member.

8. The information processing device of claim 7, wherein the pair of first positioning protrusions and the second positioning protrusion are disposed along a straight line.

9. The information processing device of claim 7, wherein the second positioning hole is formed in an elongated hole shape extending along a transverse direction of the button member.

10. The information processing device of claim 7, wherein:

in a state in which the first positioning protrusions are inserted into the first positioning holes, the first positioning protrusions position the button member with respect to the base member in a transverse direction of the button member, and in a state in which the second positioning protrusion is inserted into the second positioning hole, the second positioning protrusion positions the button member with respect to the base member in the length direction of the button member.

11. The information processing device of claim 7, wherein the second anchor member and the second positioning protrusion are disposed in a row along a transverse direction of the button member at a central portion in the length direction of the button member.

12. The information processing device of claim 11, wherein the second anchor member is provided at an end portion at the central portion of the button member.

13. The information processing device of claim 1, wherein:

the button member includes a button base, and a connector arm that connects the button base and the operation button together and that moves the operation button toward and away from the switch in conjunction with elastic deformation of the connector arm; and the anchor member and the positioning protrusion are provided at the button base.

14. The information processing device of claim 1, wherein:

the switch comprises a pair of switches that are disposed at an interval along a length direction of the base member and are fixed to the base member; and the operation button comprises a pair of operation buttons that respectively move toward and away from the pair of switches.

15. The information processing device of claim 1, further comprising a switch substrate that is fixed to the base member, wherein the switch is mounted to the switch substrate.

16. The information processing device of claim 1, wherein the operation button comprises a click button.

17. The information processing device of claim 1, wherein the switch comprises a tactile switch.

18. The information processing device of claim 1, further comprising:

a main body device that includes the case; and a display device that is coupled to the main body device so as to be capable of swinging.

19. A button unit, comprising:

a base member that includes an attachment hole and a positioning hole;

a switch that is fixed to the base member;

a button member that includes an operation button that moves toward and away from the switch;

an anchor member that is provided at the button member, and that includes an insertion tab that is inserted into the attachment hole and a claw that projects out from a leading end side of the insertion tab in a projection direction and that is hooked onto an edge portion of the attachment hole; and a positioning protrusion that is provided at the button member, and that is inserted into the positioning hole, the positioning hole being formed in an elongated hole shape, the longest dimension of the elongated hole extending along the projection direction of the claw.

* * * * *